(12) United States Patent
Patterson et al.

(10) Patent No.: US 7,237,077 B1
(45) Date of Patent: Jun. 26, 2007

(54) TOOL FOR DISK IMAGE REPLICATION

(75) Inventors: Martin Patterson, Menlo Park, CA (US); Shriram Krishnan, Oakland, CA (US); Jayaraman Manni, Santa Clara, CA (US); Benjamin H. Stoltz, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 473 days.

(21) Appl. No.: 10/731,681

(22) Filed: Dec. 8, 2003

Related U.S. Application Data

(60) Provisional application No. 60/431,813, filed on Dec. 8, 2002.

(51) Int. Cl.
*G06F 12/00* (2006.01)

(52) U.S. Cl. ..................................... 711/162; 711/152

(58) Field of Classification Search ........ 711/113–114, 711/161–162; 700/200–205; 714/6–7
See application file for complete search history.

(56) References Cited

U.S. PATENT DOCUMENTS

| 5,898,891 A | * | 4/1999 | Meyer | .......................... 710/33 |
| 2005/0097268 A1 | * | 5/2005 | Vollmer | ....................... 711/113 |

* cited by examiner

*Primary Examiner*—Brian R. Peugh
(74) *Attorney, Agent, or Firm*—Hickman Palermo Truong & Becker LLP

(57) ABSTRACT

A method and apparatus for replicating an image from a source to a destination disk are provided. Specific embodiments may be optimized for single source to multiple destination replication requests, for example. In one embodiment, the present invention provides tools and techniques for synchronous data replication responsive to asynchronous same-source-to-different-destination replication requests.

24 Claims, 8 Drawing Sheets

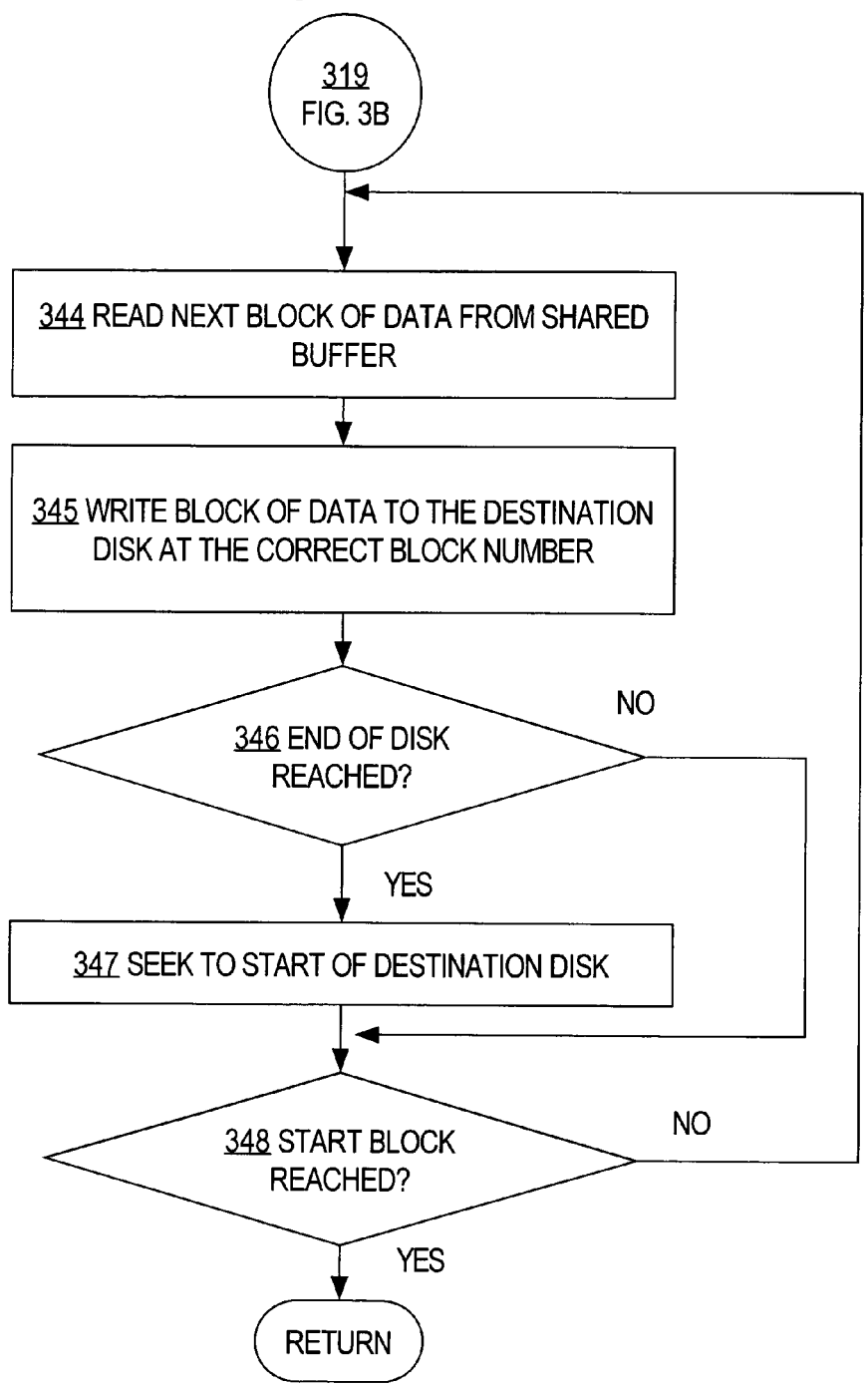

TOOL FOR DISK IMAGE REPLICATION

CLAIMS OF PRIORITY

This application claims benefit of Provisional Application Ser. No. 60/431,813, filed Dec. 8, 2002, entitled "Method and apparatus for provisioning of services on demand," by Martin Patterson, Shriram Krishnan, and Jayaraman Manni, the entire contents of which are incorporated by reference for all purposes as if fully set forth herein.

BACKGROUND

Seemingly overnight, the Internet has become the vehicle of choice of a growing segment of the population for satisfying people's needs for goods and services, entertainment and so forth. As a result, builders of web sites and other computer systems today face many systems planning issues. These include capacity planning for normal growth, expected or unexpected peak demand, availability and security of the site and so forth. Companies that wish to provide services on the Web have new business and service models, which are the areas in which they want to innovate and lead, but in order to do so they must confront challenges posed by the non-trivial complexity of designing, building and operating a large-scale web site. This includes the need to grow and scale the site while it is operational.

One response to these issues is to host an enterprise web site at a third party site, co-located with other web sites of other enterprises. Such outsourcing facilities are currently available from various companies. These facilities provide physical space, and redundant network and power facilities so that the enterprise customer or user need not provide them. The network and power facilities are shared among many enterprises or customers in an effort to attain economies of scale.

The users of these facilities, however, must still face tasks relating to managing a computing infrastructure in the course of building, operating and growing their facilities. Information technology managers of the enterprises hosted at such facilities remain responsible for selecting, installing, configuring, and maintaining their own computing equipment at the facilities. The managers must still confront difficult issues such as resource planning and handling peak capacity.

Web sites differ in internal topology. Some sites simply comprise a row of web servers that are load balanced by a load balancer. The load balancer divides the traffic between the servers to maintain a balanced processing load on each server. The load balancer may also include or may be coupled to a firewall for protecting the web servers from unauthorized traffic. Other web sites may be constructed in a multi-tier fashion, whereby a row of web servers handle Hypertext Transfer Protocol (HTTP) requests, but the bulk of the application logic is implemented in separate application servers. These application servers in turn may need to be connected back to a tier of database servers.

Given the diversity in topology of the kinds of web sites that may need to be constructed, it may appear that the only way for constructing large-scale web sites is to custom build each one. Indeed, this is the conventional approach. Many organizations are separately struggling with the same issues, and custom building each web site from scratch. This involves a significant amount of duplicate work at different enterprises.

Other issues faced by designers of web sites are resource and capacity planning. A web site may receive vastly different levels of traffic on different days or at different hours within each day. At peak traffic times, the web site hardware or software may be unable to respond to requests in a reasonable time because it is overloaded. At other times, the web site hardware or software may have excess capacity and be underutilized. Finding a balance between having sufficient hardware and software to handle peak traffic, without incurring excessive costs and having over-capacity remains allusive. Many web sites never find the right balance and chronically suffer from under-capacity or excess, capacity.

One approach to adding capacity quickly is to maintain a single copy of data images for the web site on a disk from which the image may be replicated on to other disks on demand. In one scenario, it is desirable to make many copies from a single source disk to be replicated as multiple destination disks. Each copy is executed from the beginning of the source disk to the size of the image on it. While this addresses extensibility issues, opportunities for further improvement exist. For example, often copy processes may be initiated at different times. This can result in inefficiencies since each instance of the copy operation reads from the source and copies to the destination. This type of operation can cause head contention in the storage units and greatly diminish the overall performance of all the copy operations.

SUMMARY

Embodiments of the present invention provide techniques for replicating an image from a source storage device to a destination storage device. Specific embodiments may be optimized for single source to multiple destination replication requests, for example. In one embodiment, the present invention provides techniques for synchronous data replication responsive to asynchronous same-source-to-different-destination replication requests. In one embodiment, multiple copies may be made from a single source, responsive to requests received at different times, with a single pass read of the source. Specific embodiments are applicable to disk type storage devices, however, the techniques and principles of the present invention are broadly applicable to other types of storage elements.

In one aspect, the present invention provides a machine-implemented method for replicating content of a source disk to one or more target disks. The method includes establishing at most one producer process for reading content of a source into a buffer. Establishing at least one consumer process for reading content from the buffer and writing the content to a target is also part of the method. The method further includes coordinating concurrent synchronous copy operations by the producer process from the source to the buffer and by the at least one consumer process from the buffer to the target.

In one embodiment, coordinating concurrent synchronous copy operations by the producer process from the source to the buffer and by the at least one consumer process from the buffer to the target is carried out using semaphore based synchronization of multiple concurrent copy operations into and from a shared memory.

In one embodiment, establishing at least one consumer process for reading content from the buffer and writing the content to a target includes the capability to establish at least one subsequent consumer process for reading data from the buffer and writing the content to a target. In select embodiments, the subsequent consumer process commences reading data from the shared buffer at a point where the producer process has last written data.

In one embodiment, coordinating concurrent synchronous copy operations by the producer process from the source to the buffer and by the at least one consumer process from the buffer to the target can be carried out by blocking the producer process from overwriting a portion of data in the shared buffer until each of the consumer processes has read that portion of data. This technique can enable the producer process to make only one pass through the content of the source to make multiple copies.

In one embodiment, concurrent synchronous copy operations by the producer process from the source to the buffer and by the at least one consumer process from the buffer to the target includes blocking each of the consumer processes from reading content of the buffer until the producer process has written a portion of data that the consumer process has not yet read. This technique can enable pacing of the producer process by a consumer process.

In one embodiment, establishing at least one subsequent consumer process for reading data from the buffer and writing the content to a target includes detecting when a consumer process has reach the end of a disk image in the shared buffer and cycling the consumer process to continue reading content stored in the buffer, which content was read from the beginning of the source and stored in the buffer by the producer process.

In one embodiment, establishing at least one subsequent consumer process for reading data from the buffer and writing the content to a target further comprises detecting when a consumer process has read a complete disk image from the shared buffer.

In one embodiment, a process determines whether the process is a producer process or a consumer process by detecting the presence of other disk replication processes in the system.

According to one feature, multiple copies from a single source disk start from the beginning of the disk and end at the size of the image on the disk. In another feature, copies can be made from a single source disk starting from the beginning of the disk and ending at the same location on the source disk. According to still another feature, considering specific patterns of copy operations may optimize copy performance of multiple copy operations from a single source disk.

In other aspects, embodiments of the invention encompass an apparatus and a computer-readable medium configured to carry out the foregoing processes. Specific embodiments provide the capability to prepare multiple copies of content from the same target disks. In specific embodiments, techniques according to the present invention can help mitigate adverse performance due to disk head contention in a variety of image replication scenarios. Specific embodiments may be used in conjunction with web server farms and switched storage networking techniques to provide flexible, extensible, computing services to business, technical, and governmental organizations. Specific embodiments according to the present invention enable the IT administrator or other user of the web server farm to more quickly bring additional capacity on line to meet peak usage demands. In specific embodiments, data storage devices can be more easily and more accurately prepared since the number of distinct copy operations can be reduced with appropriate practice of the techniques of the present invention.

BRIEF DESCRIPTION OF THE DRAWINGS

FIGS. 3A–3E are operational flow diagrams of disk replication processes in various specific embodiments of the present invention.

DETAILED DESCRIPTION OF EMBODIMENT(S)

System Overview

Figure 1:
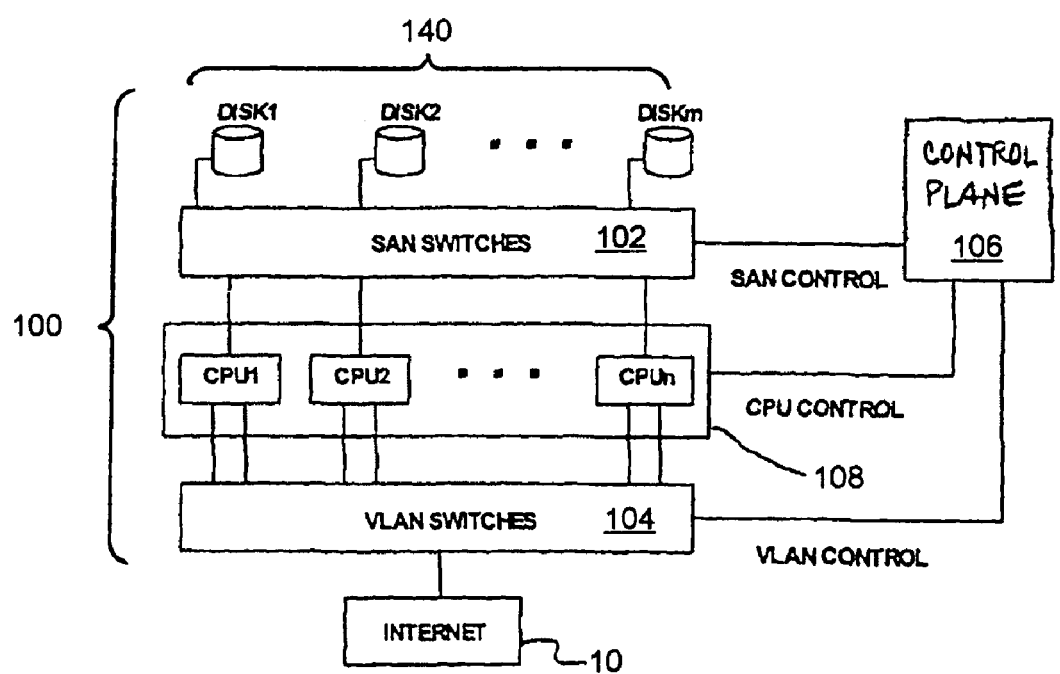
FIG. 1 is a functional block diagram of a representative computing environment in which one embodiment of the present invention may be implemented.

Embodiments of the present invention provide tools and techniques for synchronous data replication responsive to asynchronous same-source-to-different-destination replication requests. Specific embodiments of the present invention provide concurrent copy operations from a source to one or more targets responsive to one or more requests that may be asynchronously received.

In one aspect the present invention provides in one embodiment, a method for replicating content of a source disk to one or more target disks. The method includes establishing at most one producer process for reading content of a source into a buffer and establishing at least one consumer process for reading content from the buffer and writing the content to a target. Concurrent synchronous copy operations by the producer process from the source to the buffer and by the consumer processes from the buffer to the target can be coordinated according to the method. Optimal single source to multiple destination replication may be achieved by specific embodiments.

In another aspect, an embodiment of the present invention provides an apparatus comprising a producer engine, which is operative to copy data from a source to a sharable work area, one or more consumer engines, which are operative to copy data from the sharable work area to a destination and a coordination engine that is operative to coordinate the producer engine and the one or more consumer engines and the sharable work area. In specific embodiments, the apparatus can provide a single pass read of data from the source to be replicated to one or more destinations by individual instances of the consumer engines having non-concurrent start times. While application specific alternatives exist, in one embodiment, a shared memory and semaphore-based synchronization may be used to coordinate the plurality of copy operations.

In a yet further aspect, the present invention provides in one embodiment, a system, comprising a first network node; a second network node and a network connecting the first node and the second node. The first network node comprises program instructions for causing one or more processors to perform establishing a producer process for reading content of a source into a buffer. The second network node comprises program instructions for causing one or more processors to perform establishing at least one consumer process for reading content from the buffer and writing the content to a target. One or both of the first node and the second node also comprises program instructions for causing one or more processors to perform coordinating concurrent synchronous copy operations by the producer process from the source to the buffer and by the at least one consumer process from the buffer to the target.

In one embodiment, the present invention is implemented in a computing environment comprising a wide scale computing fabric ("computing grid"). The computing grid can be physically constructed once, and then logically divided up for various organizations on demand. A part of the computing grid is allocated to each of a plurality of enterprises or organizations. Each organization's logical portion of the computing grid is referred to as a Virtual Server Farm (VSF). Each organization retains independent administrative control of its VSF. Each VSF can change dynamically in terms of number of CPUs, storage capacity and disk and network bandwidth based on real-time demands placed on the server farm or other factors. Each VSF is secure from every other organizations' VSF, even though they are all logically created out of the same physical computing grid. A VSF can be connected back to an Intranet using either a private leased line or a Virtual Private Network (VPN), without exposing the Intranet to other organizations' VSFs.

Specific embodiments provide the capability to prepare multiple copies of content from the same target disks. In one embodiment, techniques are provided that can help mitigate adverse performance due to disk head contention in a variety of image replication scenarios. Specific embodiments may be used in conjunction with web server installations and switched storage networking techniques to provide flexible, extensible, computing services to business, technical, and governmental organizations. Specific embodiments according to the present invention enable the IT administrator or other user of the web server farm to more quickly bring additional capacity on line to meet peak usage demands.

FIG. 1 is a functional block diagram of a representative computing environment in which one embodiment of the present invention may be implemented. FIG. 1 illustrates one configuration of an extensible computing environment 100 that includes a local computing grid 108. In this document "extensible" generally means that the system is flexible and scalable, having the capability to provide increased or decreased computing power to a particular enterprise or user upon demand. In select embodiments, the local computing grid 108 is comprised of a large number of computing elements CPU1, CPU2, ... CPUn. In an exemplary embodiment, there may be 10,000 computing elements, or more. These computing elements do not contain or store any long-lived per-element state information, and therefore may be configured without persistent or non-volatile storage such as a local disk. Instead, all long-lived state information is stored separate from the computing elements on storage units 140, which in the illustrated embodiment are realized as disk storage devices, labeled DISK1, DISK2, ... DISKm. In the illustrated embodiment, the storage units 140 are coupled to the computing elements via a Storage Area Network (SAN) comprising one or more SAN Switches 102. Suitable SAN switches are commercially available from Brocade and Excel. In one embodiment, switches 102 are fibre-channel switches. Alternatively, switches 102 may comprise network switching or routing elements that use the iSCSI protocol over Ethernet, network switching or routing elements that use Internet Fibre Channel Protocol (iFCP), or the like.

Many other computing elements are interconnected to each other through one or more VLAN switches 104 which can be divided up into Virtual LANs (VLANs). The VLAN switches 104 are coupled to the Internet 10. In general a computing element contains one or two network interfaces connected to the VLAN switch. For reasons of clarity, in FIG. 1 all nodes are shown with two network interfaces, although some may have less or more network interfaces. Many commercial vendors now provide switches supporting VLAN functionality. For example, suitable VLAN switches are commercially available from Cisco Systems, Inc. and Xtreme Networks. Similarly there are a large number of commercially available products to construct SANs, including Fibre Channel switches, SCSI-to-Fibre-Channel bridging devices, and Network Attached Storage (NAS) devices.

Control Plane 106 is coupled by a SAN Control path, CPU Control path, and VLAN Control path to SAN switches 102, CPUs CPU1, CPU2, ... CPUn, and VLAN Switches 104, respectively.

Each VSF is composed of a set of VLANs, a set of computing elements that are attached to the VLANs, and a subset of the storage available on the SAN that is coupled to the set of computing elements. The subset of the storage available on the SAN is referred to as a SAN Zone and is protected by the SAN hardware from access from computing elements that are part of other SAN zones. VLANs that provide non-forgeable port identifiers may be used to prevent one customer or end user from obtaining access to VSF resources of another customer or end user.

One task that can arise in the computing environment 100 illustrated in FIG. 1 is to perform image replication of system images as well as customer images. In one embodiment, the computing environment 100 maintains a single copy of the images on a storage device 140 from which it is replicated on to other storage devices on demand. In one usage scenario, it is desirable to make many copies from a single source disk to be replicated as multiple destination disks. Accordingly, techniques for replicating disks will be described with reference to FIG. 2, FIGS. 3A–3E and FIG. 4.

The following nomenclature will be used to discuss the techniques of the present invention with reference to an example application in one embodiment. A process that governs the source disk is referred to herein as the "producer process" or just the "producer." Similarly, a process that governs the destination disk is referred to as the "consumer process" or just the "consumer."

Figure 2:
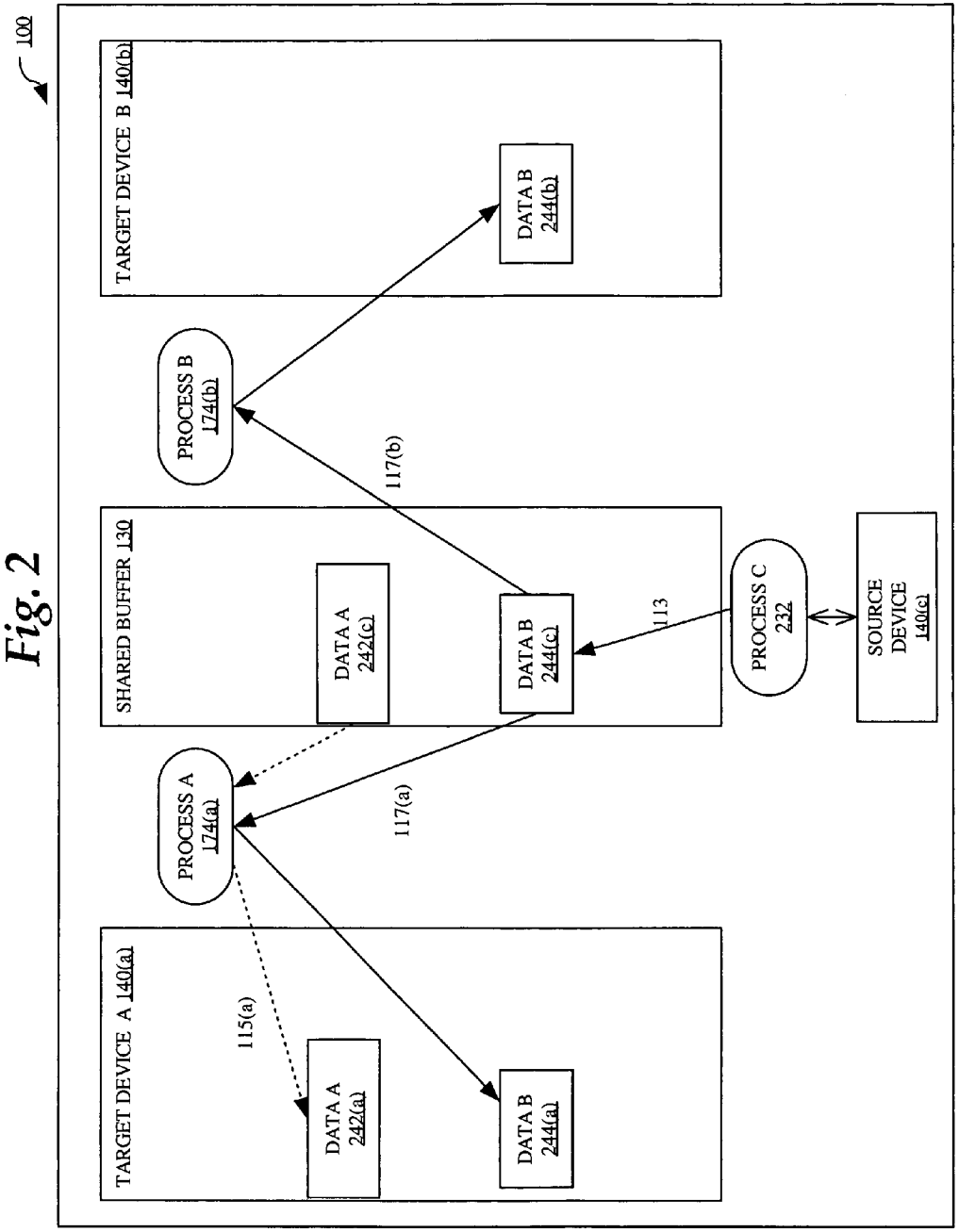
FIG. 2 is a functional block diagram illustrating the operation of a disk replication process in the computing environment of FIG. 1, in one embodiment of the present invention.

FIG. 2 is an operational diagram illustrating the operation of the computing environment of FIG. 1 during a disk replication process, in accordance with one embodiment of the present invention. In FIG. 2, operation of one embodiment is illustrated by a representative example of disk replication processing in computing environment 100. In the example disk replication processing of FIG. 2, contents of a source device 140(c) are being copied to a first target device A 140(a) and a second target device B 140 (b). A producer process C 232 copies blocks of data from the source device 140(c) into a shared buffer 130. In the illustrated embodiment, producer process C 232 began copying data from source device 140(c) starting at the beginning of the source device's disk image, and has copied data blocks into the shared buffer 130 contiguously from source device 140(c). Producer process C 232 has just copied data block the 244(c) into the shared buffer 130, as indicated by a solid arrow 113 in FIG. 2. Previously, process C 232 copied data block a 242(c) into shared buffer 130. In one embodiment, producer process C 232 copies data of the source device 140(c) in a single pass from the beginning of the source device 140(c) disk image to the end of the disk image.

FIG. 2 also illustrates a plurality of the consumer processes, consumer process A 174(a) and consumer process B 174(b), each of which reads data blocks from the shared buffer 130, and writes the data blocks to target device A 140(a) and target device B 140(b), respectively. In the example the illustrated by FIG. 2, consumer process A 174(a) was started at an earlier point in time than consumer process B 174(b). Accordingly, consumer process A 174(a) has previously copied a data block data A 242(c) to target device A 140(a) as indicated by dashed line 115(a). Consumer process B 174(b) has not yet copied data block data A 242(c). Consumer process A 174(a) has most recently copied a data block data B 244(c) from the shared buffer 130 and written to data to target device A 140(a) as indicated by solid line 117(a).

Consumer process B 174(b) was started at a later point in time, however, and in this embodiment begins copying data from the shared buffer 130 with the most recent data block written into the shared buffer 130 by producer process C 232, which in this case is data block data B 244(c). In one embodiment, initiating the copy processing at the most recently written data block into the shared buffer provides for improved throughput characteristics across multiple copy processes.

When consumer process B 174(b) reaches the end of the shared buffer 130, its read pointer will be reset to the beginning of the shared buffer 130. Accordingly, consumer process B 174(b) continues reading the data written by producer process C 232 at the beginning of the shared buffer 130 prior to the starting of consumer process B 174(b). The consumer process B 174(b) will continue reading data from the beginning of the shared buffer 130 until it reaches its start data block, which is the data block where it began copying data from the shared buffer 130 to the target device B 140(b). When consumer process B 174(b) reaches its start data block, target device B 140(b) has a complete copy of the data image of source device 140(c). Accordingly, process B 174(b) may terminate at this point.

If producer process C 232 reaches the end of shared buffer 130, it may overwrite the data at the beginning of the shared buffer 130, provided that each of the consumer processes, consumer process A 174(a) and consumer process B 174(b), each copy the data from the shared buffer that is in the location which would be overwritten by producer process C 232. In one embodiment, producer process C 232 waits until all the consumer processes 174(a) and 174(b) have copied a particular block of data, data A 242(c) in the example illustrated by FIG. 2, before overwriting the block of data with new data.

FIGS. 3A–3E are operational flow diagrams of disk replication processes in various specific embodiments of the present invention.

Figure 3A:
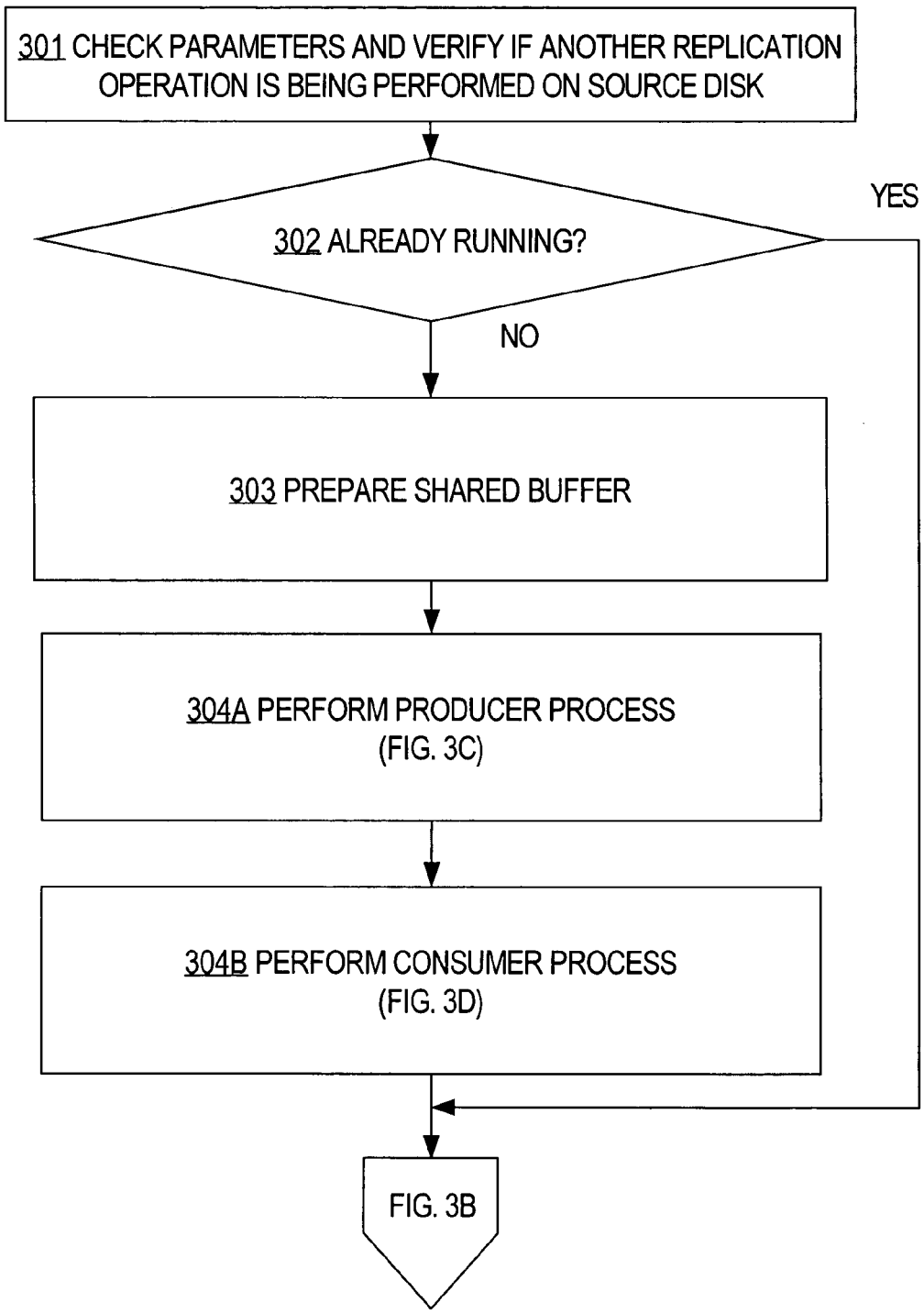

FIG. 3A is a flow diagram of a disk verification process in one embodiment of the present invention. As shown by FIG. 3A, in block 301, when a disk replication process is invoked, check its parameters and verify if another instance of the disk replication operation is being performed using the same source disk.

In block 302, if there are no other disk replication operations using the source disk, the processing of blocks 303, 304A and 304B is performed.

In block 303, a shared buffer area is initialized. In one embodiment, the shared buffer area is a single producer, multiple consumer shared memory data structure that has the following behavior:

a. The producer can obtain exclusive access to the data buffer for writing to it.

b. Multiple consumers can obtain access to the data buffer to read from it simultaneously.

c. Each registered consumer must consume a portion of the data in the shared buffer before the producer can get access to overwrite it.

d. Consumers can access the buffer provided that the producer has written new data into it, where new data refers to valid data that the consumer has not yet read.

Of course, not all of the above-described behavior features will be present in all embodiments. Further, in select specific embodiments, other and different behavioral features may be chosen to govern the functioning of the shared buffer, as will be readily apparent to those skilled in the art.

In blocks 304A and 304B, two processes are started. One process governs the source and is referred to herein as the "producer," and one process governs the destination and is referred to herein as the "consumer."

In block 304A, the producer process starts a loop that reads a block of data from the source and writes the data and the block number to the shared buffer. After copying each block, the processing checks if any consumers are registered. If there are no registered consumers, then the process cleans up the data structures and exits. The producer process of block 304A of one embodiment is described in further detail with reference to FIG. 3C below.

In block 304B, the consumer process starts a loop that reads the block of data from the shared buffer and writes the data to the destination. The consumer process registers itself with the shared buffer when it starts. In application-specific alternative embodiments, registration may comprise any exchange of identity information using any of a variety of common communications protocols or copying the identity information into a control structure, or the like. Once the consumer process copies all the blocks, it unregisters itself with the shared buffer and exits. The consumer process of block 304B of one embodiment is described in further detail with reference to FIG. 3D below.

Figure 3B:
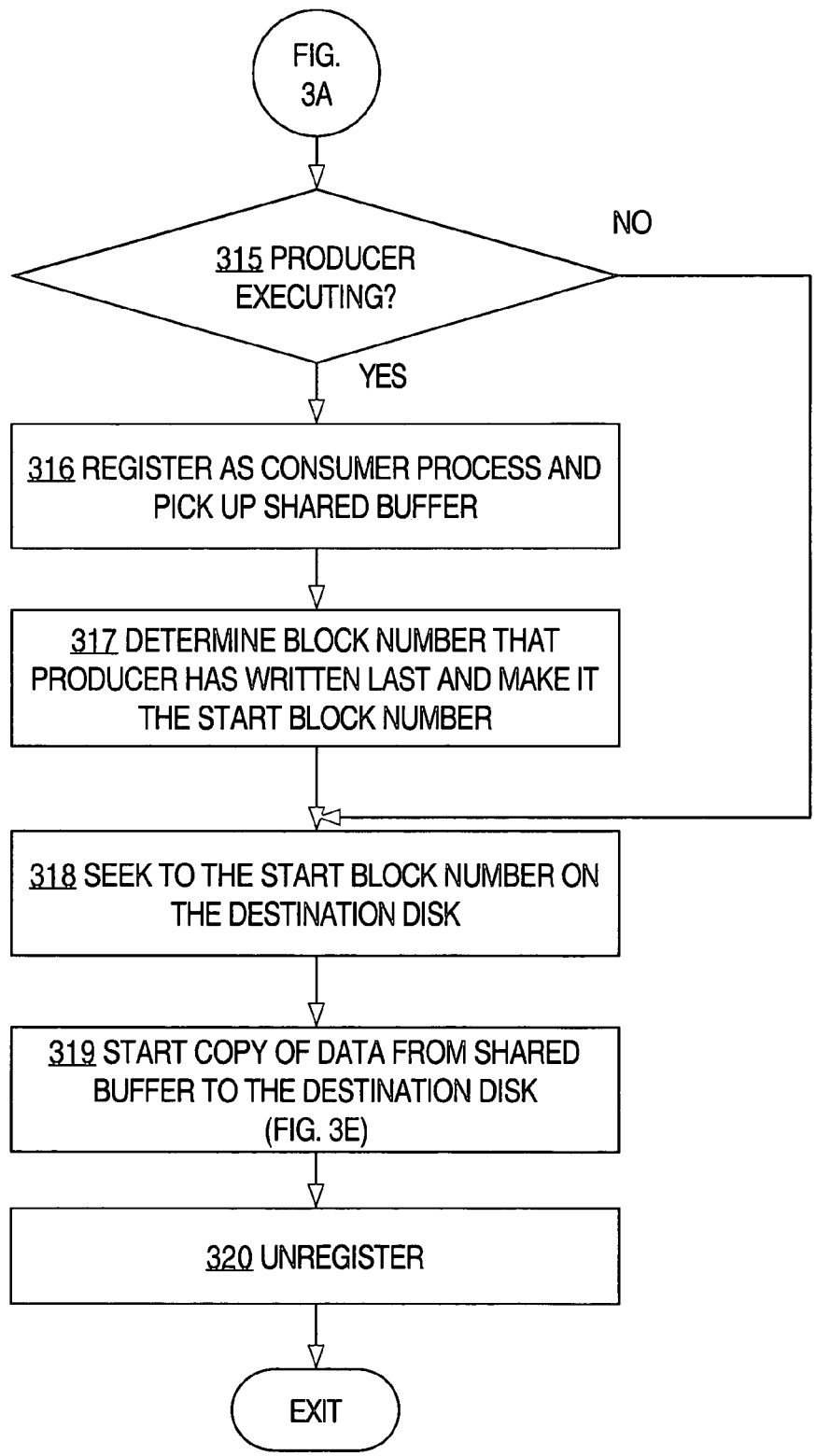
Figure 3C:
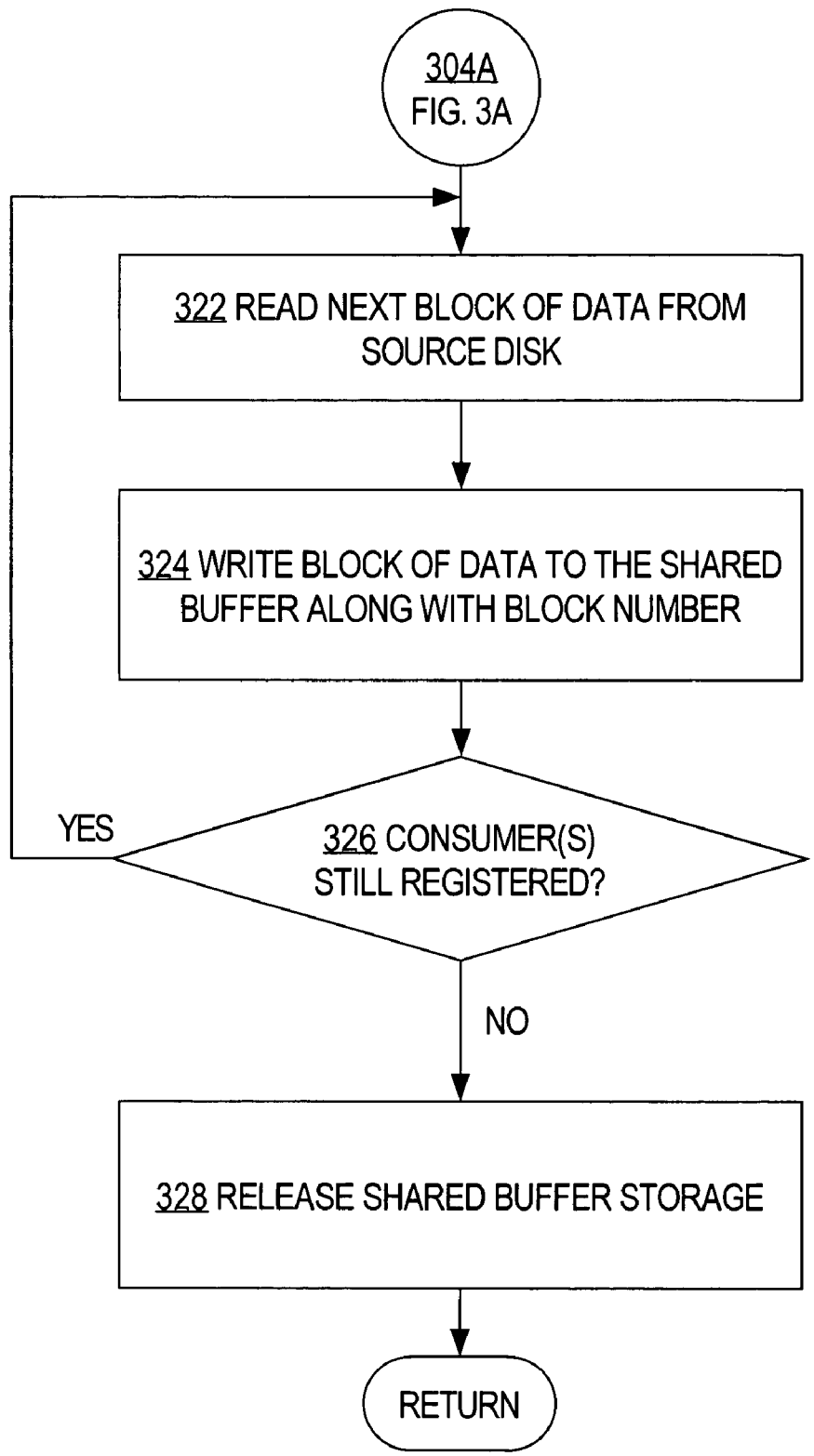
Figure 3D:
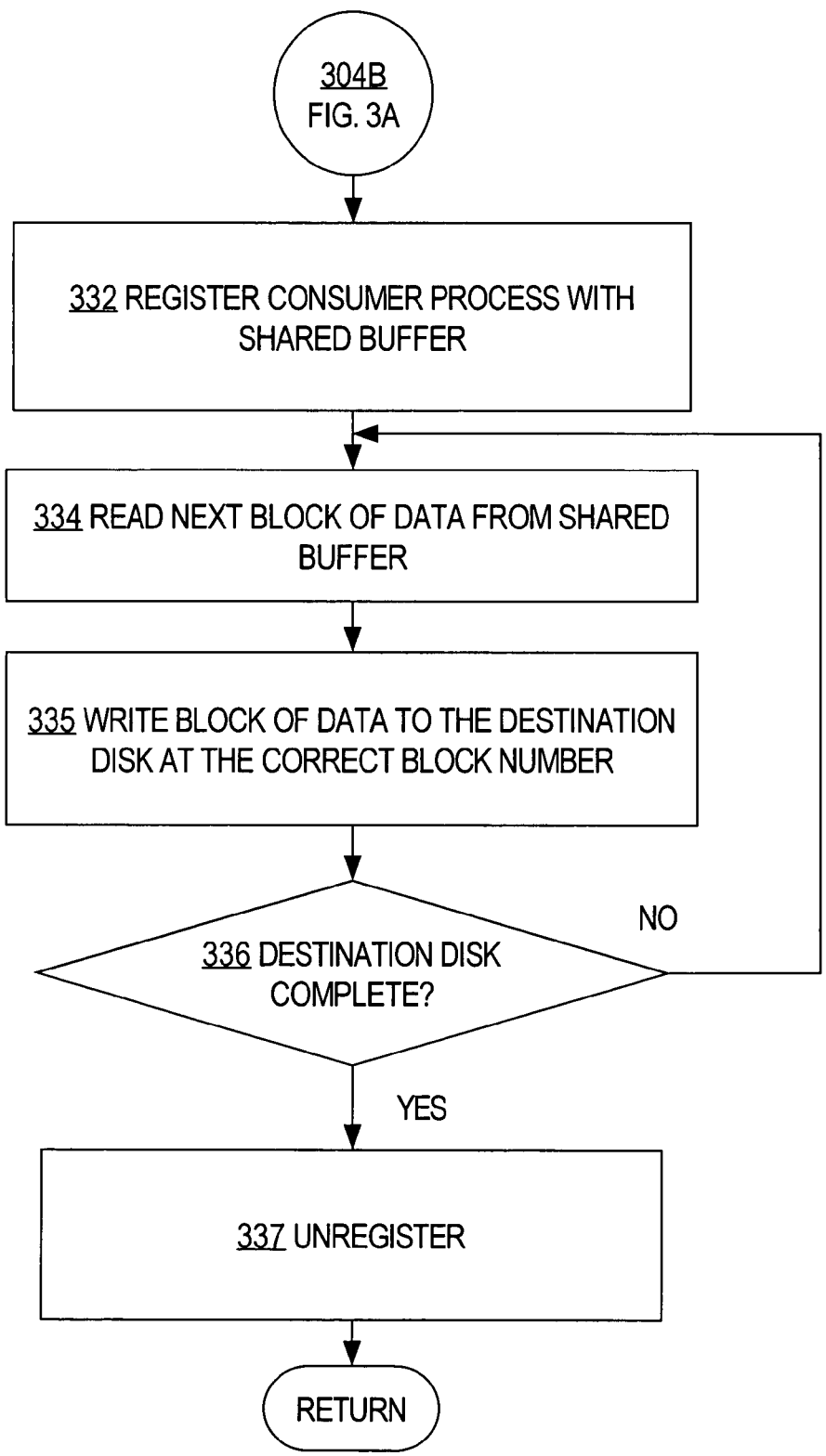

Referring now to FIG. 3B, in block 315, a test is performed to determine whether an instance of a producer process for the source is executing in the system. If there is already a producer process executing in the system for the source that is being copied, then the current instance of the disk replication process assumes the role of a consumer process and performs the processing of blocks 316 and 317. In one embodiment, the processing of blocks 316 and 317 enable a subsequently started consumer process to begin copying data from the shared buffer onto another disk with minimal disturbance to the copy processing of an earlier started consumer process.

In block 316, the shared buffer created by the producer process is obtained and the process registers as a consumer. By registering with the shared buffer, the process is granted permission to access the shared buffer.

In block 317, a block number for the block that the producer process last wrote is determined. This block number becomes the start block number for the consumer process.

In block 318, a seek operation to the start block number on the destination is performed. In one embodiment, this enables the consumer process to begin a copy operation at a block number other than the start of the destination.

In block 319, processing is started that copies data from the shared buffer to the destination until the last block is reached. If the next block to be copied is block zero and the starting block was not block zero, the process will cause a seek operation to the start of the destination to occur and continue the copy process until all blocks from the beginning of the disk to the start block have been copied.

In block 320, the process unregisters itself with the shared buffer and exits.

While certain embodiments are described herein with respect to a switched computing environment that includes a switched computing grid, such computing environments represent only one example context in which the broad techniques described herein may be used. The techniques herein can be used with any computing environment having any network elements or infrastructure in which quickly replicating data images of storage devices is desirable.

Hardware Overview

Figure 4:
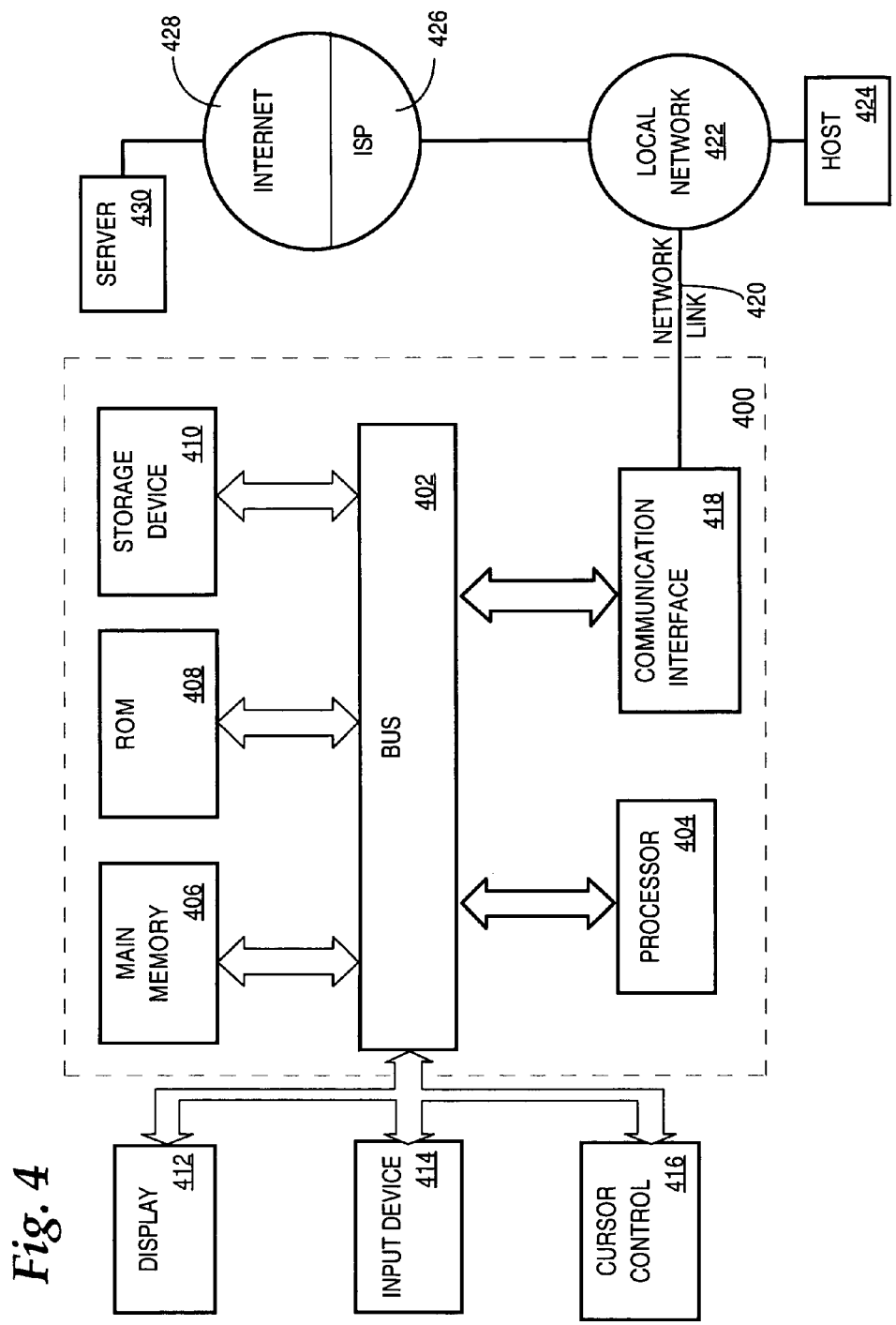
FIG. 4 is a hardware block diagram of a representative computer system, which may be used to embody one or more components of an embodiment of the present invention.

In one embodiment, the various components of computing environment 100 shown in FIG. 1 can be implemented as sets of instructions executable by one or more processors. These components may be implemented as programs executable under an operating system, including but not limited to the Solaris™ operating system produced by Sun Microsystems, Inc. In other embodiments, components of computing environment 100 may comprise a personal computer or server executing LINUX, UNIX, Microsoft Windows™, and the like. FIG. 4 shows a hardware block diagram of a computer system 400 which may be used to execute these components. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment, the functionality of the present invention is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, it should be noted that although the invention has been described with reference to a specific embodiment, it should not be construed to be so limited. In particular, while certain embodiments are described herein with respect to a SAN switched computing environment that includes a switched computing grid, such computing environments represent only one example context in which the broad techniques described herein may be used. The techniques herein can be used with any computing environment having any network elements or infrastructure in which quickly replicating data images of storage devices is desirable.

Various modifications may be made by those of ordinary skill in the art with the benefit of this disclosure without departing from the spirit of the invention. Thus, the invention should not be limited by the specific embodiments used to illustrate it but only by the scope of the issued claims. The specification and drawings are, accordingly, to be regarded as illustrative rather than limiting.

What is claimed is:

1. A machine implemented method for replicating content of a source disk to at least one of a plurality of target disks, comprising:
    establishing at most one producer process for reading content of a source disk into a buffer;
    establishing at least one consumer process for reading content from the buffer and writing the content to a target disk; and
    coordinating concurrent synchronous copy operations by the producer process from the source disk to the buffer and by the at least one consumer process from the buffer to the target disk, wherein coordinating concurrent synchronous copy operations by the producer process from the source disk to the buffer and by the at least one consumer process from the buffer to the target disk comprises synchronization of multiple concurrent copy operations into and from a shared memory.

2. The method of claim 1, wherein the synchronization of multiple concurrent copy operations into and from a shared memory is semaphore based.

3. The method of claim 1, wherein establishing at least one consumer process for reading content from the buffer and writing the content to a target disk comprises establishing at least one subsequent consumer process for reading data from the buffer and writing the content to a target disk, wherein the subsequent consumer process commences reading data from the shared buffer at a point where the producer process has last written data.

4. The method of claim 3, wherein coordinating concurrent synchronous copy operations by the producer process from the source disk to the buffer and by the at least one consumer process from the buffer to the target disk comprises blocking the producer process from overwriting a portion of data in the shared buffer until each of the consumer processes has read the portion of data.

5. The method of claim 4, thereby enabling the producer to process to make only one pass through the content of the source disk.

6. The method of claim 3, wherein coordinating concurrent synchronous copy operations by the producer process from the source disk to the buffer and by the at least one consumer process from the buffer to the target disk comprises blocking each of the consumer processes from reading content of the buffer until the producer process has written a portion of data that the consumer process has not yet read.

7. The method of claim 6, thereby enabling pacing of the producer process by a consumer process.

8. The method of claim 3, wherein establishing at least one subsequent consumer process for reading data from the buffer and writing the content to a target disk comprises detecting when a consumer process has reached the end of a disk image in the shared buffer and cycling the consumer process to continue reading content stored in the buffer, which content was read from the source disk and stored in the buffer by the producer process.

9. The method of claim 8, wherein establishing at least one subsequent consumer process for reading data from the buffer and writing the content to a target disk further comprises detecting when a consumer process has read a complete disk image from the shared buffer.

10. The method of claim 1, wherein a process determines whether the process is a producer process or a consumer process by detecting the presence of other disk replication processes in the system.

11. A computer-readable medium carrying one or more sequences of instructions for replicating a disk, which instructions, when executed by one or more processors, cause the one or more processors to carry out the steps of:
    establishing at most one producer process for reading content of a source disk into a buffer;
    establishing at least one consumer process for reading content from the buffer and writing the content to a target disk; and
    coordinating concurrent synchronous copy operations by the producer process from the source disk to the buffer and by the at least one consumer process from the buffer to the target disk, wherein coordinating concurrent synchronous copy operations by the producer process from the source disk to the buffer and by the at least one consumer process from the buffer to the target disk comprises synchronization of multiple concurrent copy operations into and from a shared memory.

12. The computer-readable medium of claim 11, wherein the synchronization of multiple concurrent copy operations into and from a shared memory is semaphore based.

13. The computer-readable medium of claim 11, wherein the instructions for carrying out the step of establishing at least one consumer process for reading content from the buffer and writing the content to a target disk comprises the instructions for carrying out a step of establishing at least one subsequent consumer process for reading data from the buffer and writing the content to a target disk, wherein the subsequent consumer process commences reading data from the shared buffer at a point where the producer process has last written data.

14. The computer-readable medium of claim 13, wherein the instructions for carrying out the step of coordinating concurrent synchronous copy operations by the producer process from the source disk to the buffer and by the at least one consumer process from the buffer to the target disk comprises the instructions for carrying out a step of blocking the producer process from overwriting a portion of data in the shared buffer until each of the consumer processes has read the portion of data.

15. The computer-readable medium of claim 14, thereby enabling the producer to process to make only one pass through the content of the source disk.

16. The computer-readable medium of claim 13, wherein the instructions for carrying out the step of coordinating concurrent synchronous copy operations by the producer process from the source disk to the buffer and by the at least one consumer process from the buffer to the target disk comprises the instructions for carrying out a step of blocking each of the consumer processes from reading content of the buffer until the producer process has written a portion of data that the consumer process has not yet read.

17. The computer-readable medium of claim 16, thereby enabling pacing of the producer process by a consumer process.

18. The computer-readable medium of claim 13, wherein the instructions for carrying out the step of establishing at least one subsequent consumer process for reading data from the buffer and writing the content to a target disk comprises the instructions for carrying out a step of detecting when a consumer process has reached the end of a disk image in the shared buffer and cycling the consumer process to continue reading content stored in the buffer, which content was read from the source disk and stored in the buffer by the producer process.

19. The computer-readable medium of claim 18, wherein the instructions for carrying out the step of establishing at least one subsequent consumer process for reading data from the buffer and writing the content to a target disk further comprises the instructions for carrying out a step of detecting when a consumer process has read a complete disk image from the shared buffer.

20. The computer-readable medium of claim 11, wherein a process determines whether the process is a producer process or a consumer process by execution of instructions for carrying out a step of detecting the presence of other disk replication processes in the system.

21. An apparatus comprising:
   means for establishing at most one producer process for reading content of a source disk into a buffer;
   means for establishing at least one consumer process for reading content from the buffer and writing the content to a target disk; and
   means for coordinating concurrent synchronous copy operations by the producer process from the source disk to the buffer and by the at least one consumer process from the buffer to the target disk, wherein coordinating concurrent synchronous copy operations by the producer process from the source disk to the buffer and by the at least one consumer process from the buffer to the target disk comprises synchronization of multiple concurrent copy operations into and from a shared memory.

22. An apparatus comprising:
   a producer engine operative to copy data from a source disk to a sharable work area;
   at least one consumer engine operative to copy data from the sharable work area to a destination disk; and
   a coordination engine operative to coordinate concurrent synchronous copy operations by the producer engine from the source disk to the buffer and by the at least one consumer engine from the buffer to the target disk, wherein coordinating concurrent synchronous copy operations by the producer process from the source disk to the buffer and by the at least one consumer process from the buffer to the target disk comprises synchronization of multiple concurrent copy operations into and from a shared memory.

23. A system, comprising:
   a first computer, operatively configured to execute program instructions for performing the steps of:
      establishing a producer process for reading content of a source disk into a buffer;
      establishing at least one consumer process for reading content from the buffer and writing the content to a target disk; and
      coordinating concurrent synchronous copy operations by the producer process from the source disk to the buffer and by the at least one consumer process from the buffer to the target disk, wherein coordinating concurrent synchronous copy operations by the producer process from the source disk to the buffer and by the at least one consumer process from the buffer to the target disk comprises synchronization of multiple concurrent copy operations into and from a shared memory; and
   a second computer, operative to execute program instructions for performing the steps of:
      monitoring the first computer; and
      a network interconnecting the first computer and the second computer.

24. A system, comprising:
   a first network node;
   a second network node; and
   a network connecting the first node and the second node, wherein:
   the first network node comprises program instructions for causing one or more processors to perform the step of:
      establishing a producer process for reading content of a source disk into a buffer; and
   the second network node comprises program instructions for causing one or more processors to perform the step of:
      establishing at least one consumer process for reading content from the buffer and writing the content to a target disk; and
   wherein at least one of the first node and the second node further comprises program instructions for causing one or more processors to perform the step of:
      coordinating concurrent synchronous copy operations by the producer process from the source disk to the buffer and by the at least one consumer process from the buffer to the target disk, wherein coordinating concurrent synchronous copy operations by the producer process from the source disk to the buffer and by the at least one consumer process from the buffer to the target disk comprises synchronization of multiple concurrent copy operations into and from a shared memory.

* * * * *